US010646053B1

(12) United States Patent
Cao

(10) Patent No.: US 10,646,053 B1
(45) Date of Patent: May 12, 2020

(54) MODULAR DISPLAY CASE

(71) Applicant: Yang Cao, Suwanee, GA (US)

(72) Inventor: Yang Cao, Suwanee, GA (US)

( * ) Notice: Subject to any disclaimer, the term of this patent is extended or adjusted under 35 U.S.C. 154(b) by 0 days.

(21) Appl. No.: 16/556,867

(22) Filed: Aug. 30, 2019

Related U.S. Application Data

(60) Provisional application No. 62/786,164, filed on Dec. 28, 2018.

(51) Int. Cl.
    F21V 23/04      (2006.01)
    A47F 3/00       (2006.01)
    F21V 23/00      (2015.01)
    F21V 21/26      (2006.01)

(52) U.S. Cl.
    CPC .............. A47F 3/001 (2013.01); F21V 21/26 (2013.01); F21V 23/003 (2013.01); F21V 23/04 (2013.01)

(58) Field of Classification Search
    CPC ........................... G02F 1/133305; G09F 9/301
    See application file for complete search history.

(56) References Cited

U.S. PATENT DOCUMENTS 4,768,661 A *   9/1988  Pfeifer .................... A47F 5/005
                                                       211/184
5,069,332 A *  12/1991  Williams ............. A45C 7/0054
                                                       206/495
5,788,349 A    8/1998  DeMaine et al.
5,971,826 A   10/1999  Delzompo
6,527,129 B2 *  3/2003  Osawa .................... A47F 5/005
                                                       211/184

OTHER PUBLICATIONS

Nokere 3 Steps Display Case/Box Dustproof ShowCase, "https://www.amazon.com/Nokere-Dustproof-Transparent-Christmas-10-04X6-10X5-43/dp/B072R3XL5W/ref=pd_sbs_201_20?_encoding=UTF8&pd_rd_i=".
Nokere Acrylic 3 Steps Display Case for Collectibles and Action Figures, "https://www.amazon.com/Nokere-Acrylic-Collectibles-Showcase-Gifts-Children/dp/B07HGQ8JBX/ref=pd_day0_hl_21_8?_encoding=UTF8&pd_rd_i=".
Museum Lighting, "https://www.display-lighting.com/museum-lighting/".
SPECTRUM 1.5W LED Plug & Play, "https://www.display-lighting.com/led-display-spotlights/spectrum-1-5w-led-plug-and-play/dkit1xs154-300-rf.html".

* cited by examiner

Primary Examiner — Evan P Dzierzynski

(57) ABSTRACT

A modular display case is an apparatus that houses at least one desired item. The apparatus is able to effectively protect a desired item as the apparatus includes an enclosure, a plurality of lateral walls, a cover, an interconnecting system, a plurality of lamps, and a power source. The enclosure houses the power source and upholds a desired item, the plurality of lateral walls, the cover, and the plurality of lamps. The plurality of walls and the cover surround and aid in the preservation of a desired item. The plurality of walls and the cover are transparent. The plurality of walls and the cover are attachable with each other and the enclosure with the interconnecting system of a plurality of tabs, a plurality of notches, a plurality of first tab-receiving slots, and a plurality of second tab-receiving slots. The plurality of lamps illuminates the desired item with the power source.

18 Claims, 6 Drawing Sheets

US 10,646,053 B1

MODULAR DISPLAY CASE

The current application claims priority to U.S. provisional application Ser. No. 62/786,164 filed on Dec. 28, 2018.

FIELD OF THE INVENTION

The present invention generally relates to displays. More specifically, the present invention is modular display case.

BACKGROUND OF THE INVENTION

Exhibitions, museums, retail stores, restaurants or houses are always for the hunt for a decent and effective display case. While displaying a piece of artwork or an object it is crucial that the piece of artwork or object is being displayed properly with appropriate lighting and protection from the environment. A viewer can easily get distracted and irritated if the artwork or object is not being displayed properly. In order to attract more customers in exhibitions, museums, stores and the like, it is essential to house such display cases that will increase the pleasure of viewing different artworks and objects. Additionally, typical display apparatuses do not remain completely stationary. Once an exhibition has been concluded, the display apparatuses are transported from one location to another. Consequently, there is need for display apparatuses to be portable without occupying more space than necessary. The present invention serves the purpose of displaying different articles with clear visibility, proper lighting, security and ease of transportation.

An objective of the present invention is to provide a means of displaying an object with the right orientation, proper lighting, clear visibility, ease of assembling, disassembling and transporting. The present invention not only displays the artwork or object but also protects the artwork or object from dirt, humidity, wind, extreme light, adverse environmental conditions and the viewers so that no damage is done to the valuable artwork or object that is being displayed. The present invention can also be assembled and disassembled making it portable. Since different artworks and objects can be of different sizes and shapes, the present invention accommodates for that as well. The present invention may vary in size and shape. When assembled the display apparatus is rigid and has no chance of moving or falling apart.

In the present invention, the modular display case also features movable articulations that allows the user to adjust the lighting at any angle, both horizontally and vertically. Moreover, the brightness of the lights can be brightened or dimmed. In another embodiment of the present invention, the display apparatus has different colored lighting of the lamps. Overall, the display apparatus is perfect for displaying artwork or object with multiple features.

DETAILED DESCRIPTION OF THE INVENTION

Figure 1:
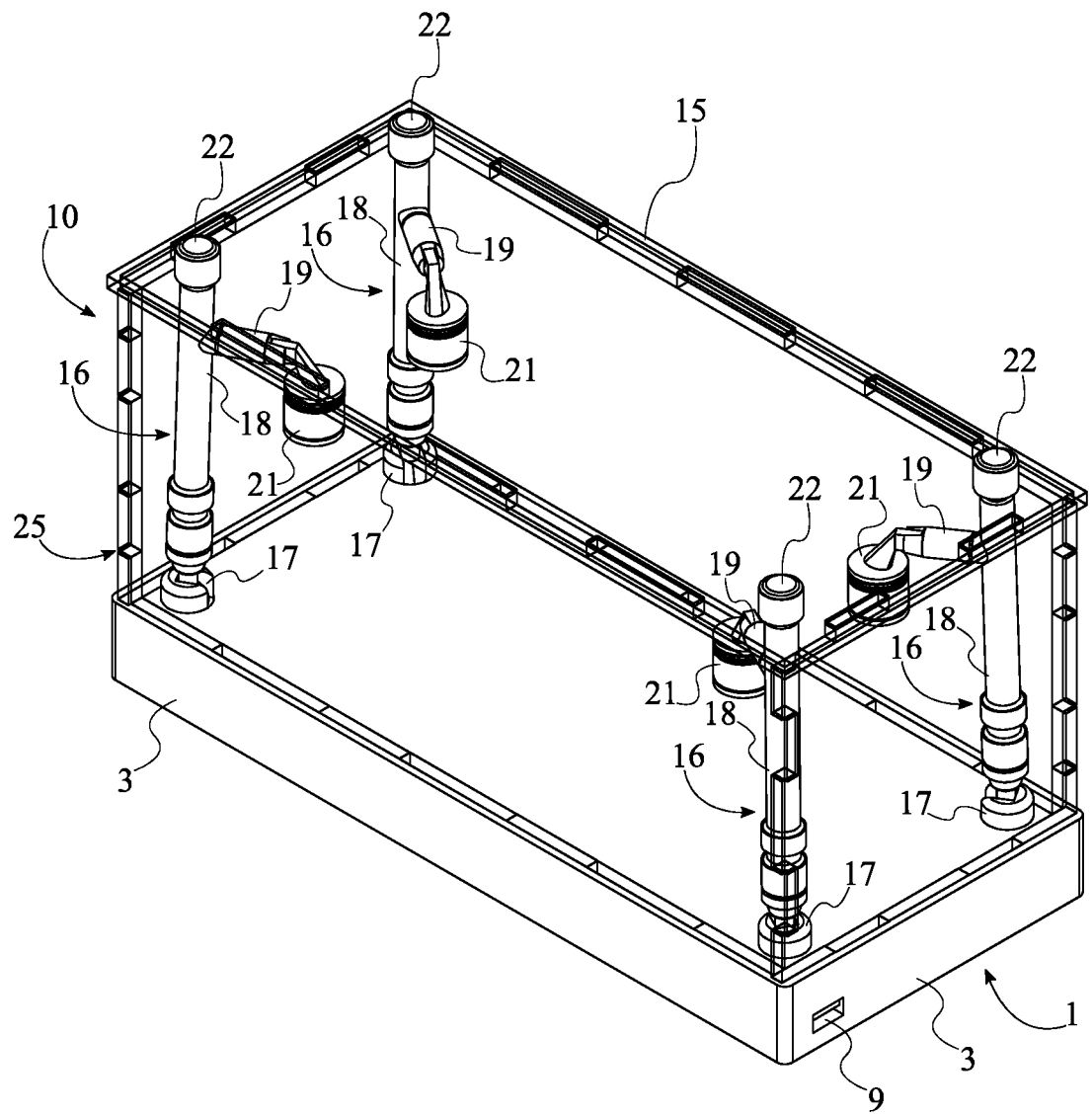
FIG. 1 is a perspective view of the present invention.

All illustrations of the drawings are for the purpose of describing selected versions of the present invention and are not intended to limit the scope of the present invention.

The present invention is a modular display case that is both collapsible and capable of protecting a variety of items. The present invention is collapsible for transportation and storage. Items within the present invention are effectively shielded from dust, moisture, and damage from the surrounding environment. In order for the present invention to remain collapsible while effectively enclosing items, the present invention comprises an enclosure 1, a plurality of lateral walls 10, a cover 15, an interconnecting system 25, a plurality of lamps 16, and a power source 31, seen in FIG. 1, FIG. 3, FIG. 4, and FIG. 6. The enclosure 1 houses and conceals all electronic components and connections. The enclosure 1 also upholds and further surrounds at least one desired item with the plurality of lateral walls 10 and the cover 15. The plurality of lateral walls 10 and the cover 15 shield the at least one desired item while allowing the at least one desired item to be visible from the surrounding environment. In the preferred embodiment of the present invention, the plurality of lateral walls 10 and the cover 15 comprise transparent materials, and the enclosure 1 comprises opaque materials. The interconnecting system 25 allows the enclosure 1, each of the plurality of walls, and the cover 15 to be attachable with each other. Furthermore, the interconnecting system 25 comprises a plurality of tabs 26, a plurality of notches 27, a plurality of first tab-receiving slots 28, and a plurality of second tab-receiving slots 29. The plurality of tabs 26 and notches allows each of the lateral walls to connect with each other, the enclosure 1, and the cover 15. The plurality of first tab-receiving slots 28 allows the plurality of tabs 26 to connect with the enclosure 1. Similarly, the plurality of second tab-receiving slots 29 allows the plurality of tabs 26 to connect with the cover 15. The appearance of the at least one desired item within the enclosure 1, the plurality of walls, and the cover 15 is enhanced with illumination from the plurality of lamps 16. Furthermore, the plurality of lamps 16 reinforces the structural integrity of the plurality of walls and the cover 15 with the enclosure 1. The plurality of lamps 16 receives the necessary power from the power source 31. The power source 31 is preferably an external power source 31 that is connected with an electrical cord in various embodiments. The external power source may include but is not limited to an outlet or a portable power supply.

Figure 4:
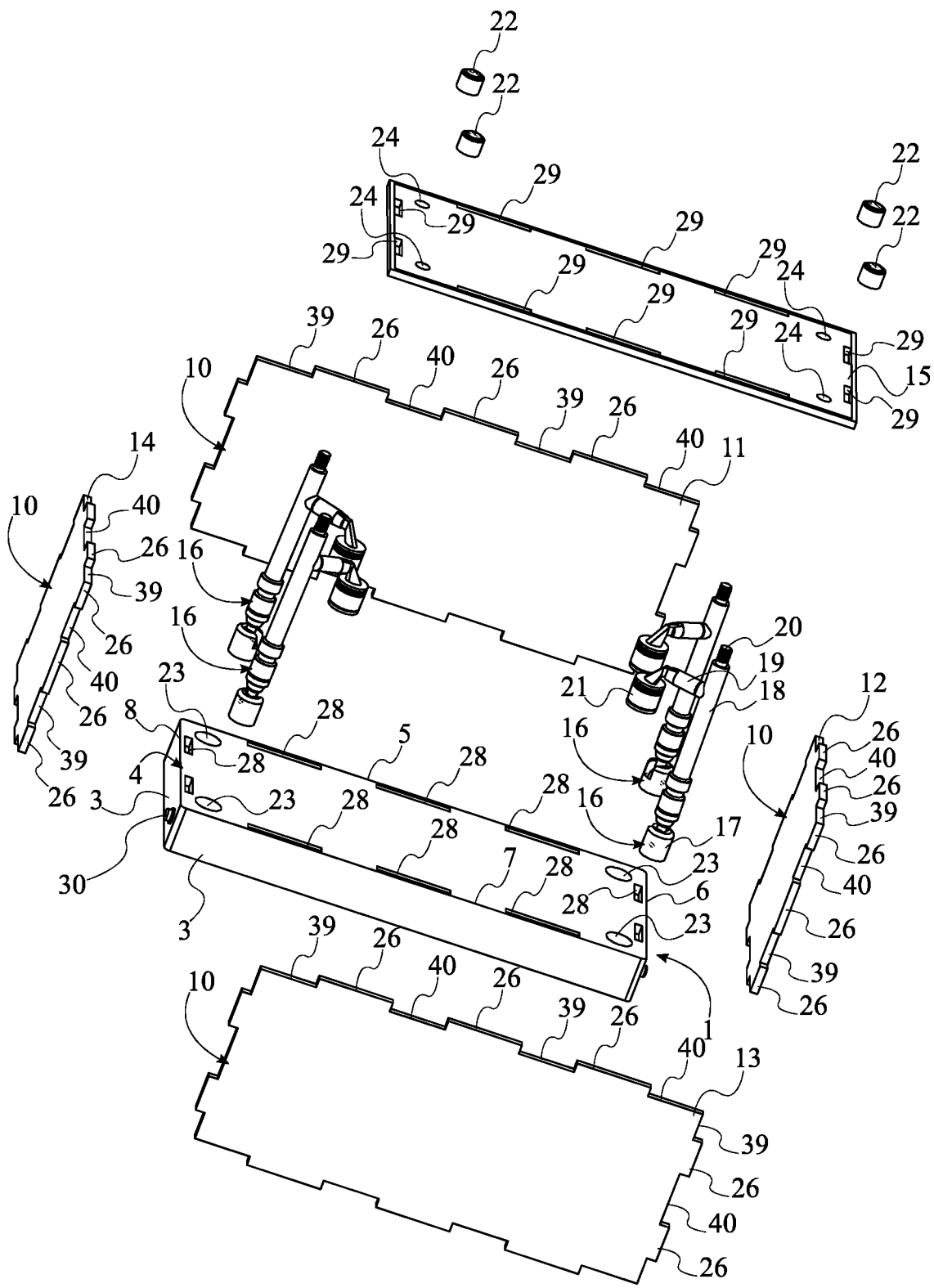
FIG. 4 is a fully exploded view of the present invention.
Figure 5:
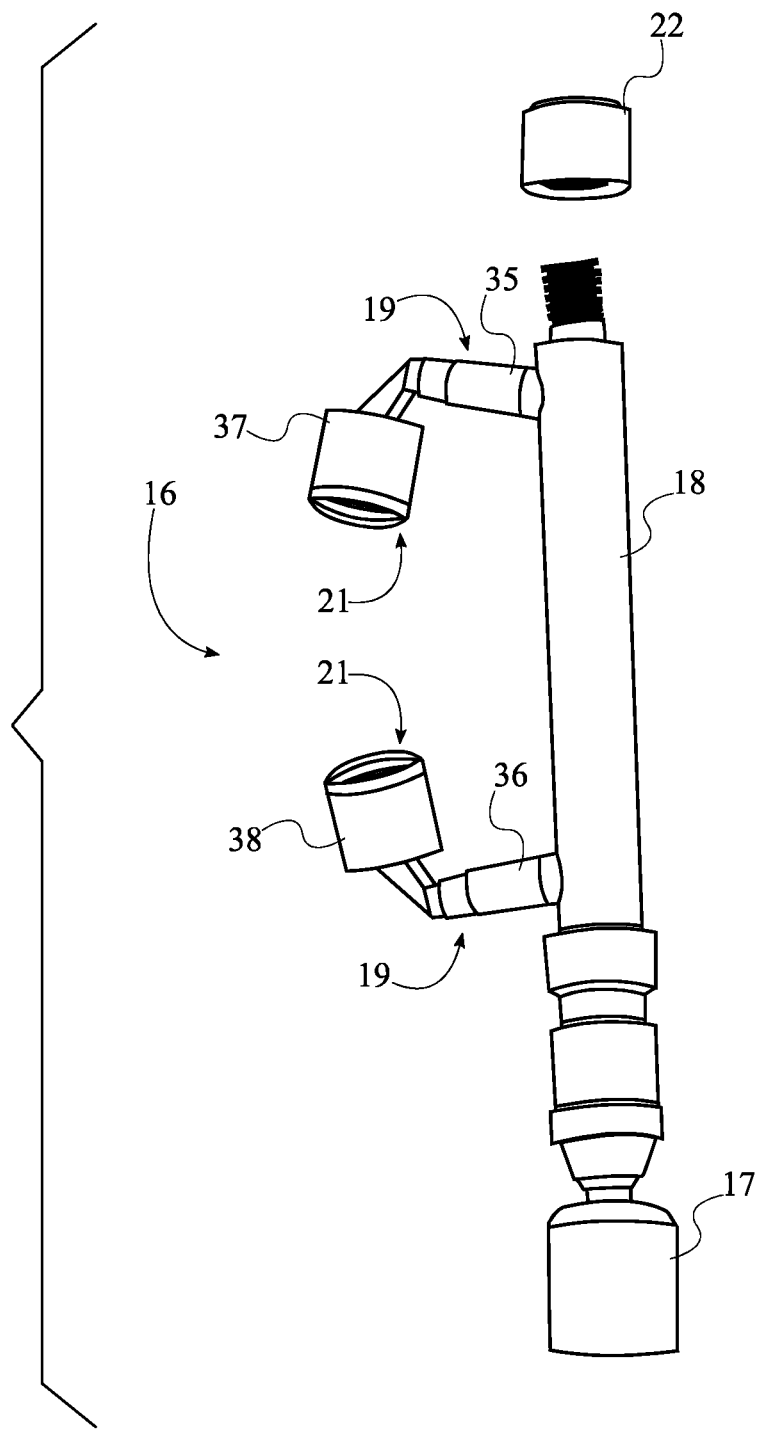
FIG. 5 is an exploded view of an alternate embodiment of the present invention with a lamp with a primary light source and a supplementary light source.

The overall configuration of the aforementioned components effectively houses at least one desired item while preserving the modular construction of the present invention as the plurality of tabs 26 and the plurality of notches 27 are perimetrically distributed across the plurality of lateral walls 10, seen in FIG. 4. Moreover, each tab of the plurality of tabs 26 is positioned in between an arbitrary notch 39 and an adjacent notch 40 of the plurality of notches 27. There is ample room around the at least one desired item while positioned within the present invention as the plurality of first tab-receiving slots 28 perimetrically traverse into the enclosure 1. Similarly, the plurality of second tab-receiving slots 29 perimetrically traverse through the cover 15. This arrangement maximizes the space between the plurality of lateral walls 10 and the at least one desired item. The cover 15 is offset from the enclosure 1 as the plurality of walls is positioned between the enclosure 1 and the cover 15. The at least one desired item is accessible within the present invention and the present invention is collapsible as the plurality of lateral walls 10 is removably coupled with each other with the plurality of tabs 26 and the plurality of notches 27. The plurality of walls is separable from the enclosure 1 as the plurality of lateral walls 10 are removably coupled with the enclosure 1 with the plurality of tabs 26 and the plurality of first tab-receiving slots 28. Similarly, the cover 15 is separable with the plurality of walls as the plurality of lateral walls 10 is removably coupled with the cover 15 with the plurality of tabs 26 and the plurality of second tab-receiving slots 29. In the preferred embodiment of the invention, each of the plurality of tabs 26 frictionally engages with the corresponding notch of the plurality of notches 27, the corresponding first tab of the plurality of first tab-receiving slots 28, and the corresponding second tab of the plurality of second tab-receiving slots 29, respectively. The cover 15, and consequently the plurality of lateral walls 10, is structurally reinforced with the enclosure 1 by the plurality of lamps 16 as the plurality of lamps 16 is connected between the enclosure 1 and the cover 15. The plurality of lamps 16 illuminates the at least one desired item housed within the enclosure 1, the plurality of lateral walls 10, and the cover 15 as the power source 31 is electrically connected with the plurality of lamps 16.

Figure 3:
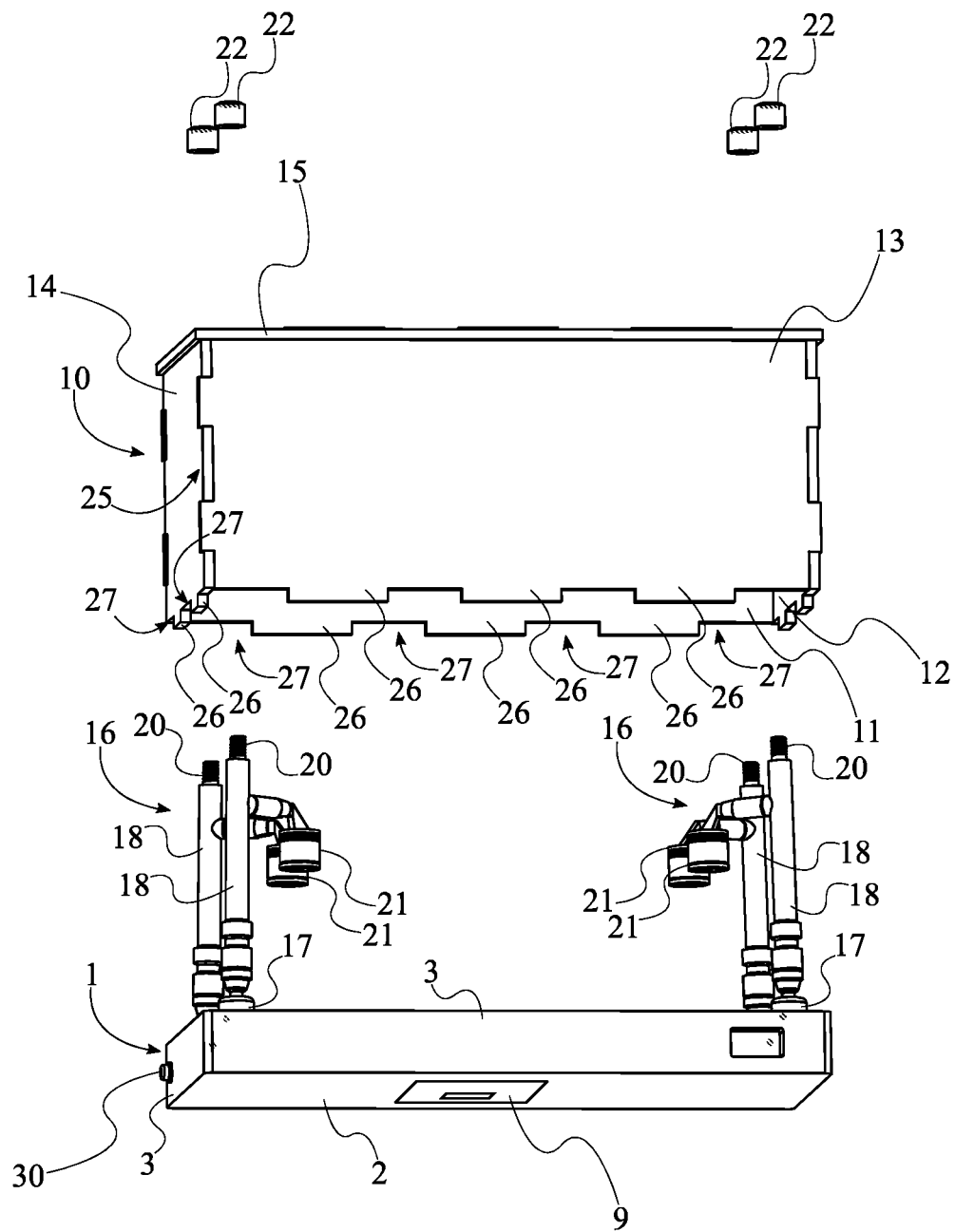
FIG. 3 is a partially exploded view of the present invention.

The present invention remains compact while in a collapsed configuration as the plurality of lamps 16 is separable from the enclosure 1 and the cover 15, seen in FIG. 3 and FIG. 4. The modular construction of the present invention is preserved as the present invention comprises a plurality of first lamp-receiving slots 23 and a plurality of second lamp-receiving slots 24. Furthermore, each of the plurality of lamps 16 comprises a base 17, a first post 18, at least one second post 19, a threaded shaft 20, at least one light source 21, and a cap 22. The plurality of lamps 16 is positioned into the enclosure 1 and the cover 15 with the first lamp-receiving slots and the second lamp-receiving slots, respectively. The base 17 upholds the first post 18, the at least one second post 19, the threaded shaft 20, and the at least one light source 21. Moreover, the base 17 connects the first post 18 with the enclosure 1. The first post 18 upholds the at least one second post 19, and consequently the at least one light source 21. The first post 18 also supports the cover 15 along with the plurality of lateral walls 10. The at least one second post 19 suspends the at least one light source 21 near the at least one desired item displayed within the present invention. The threaded shaft 20 connects the first post 18 with the cover 15, and the cap 22 fastens the threaded shaft 20 with the cover 15.

Figure 2:
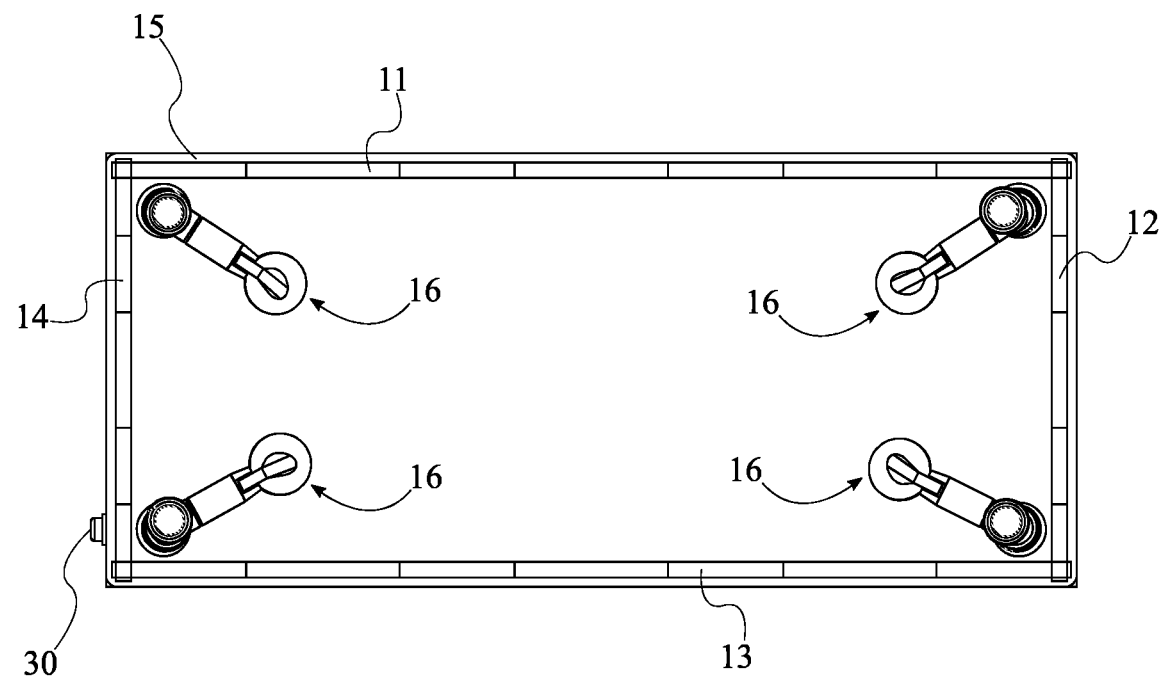
FIG. 2 is a top side view of the present invention.

The plurality of lamps 16 does not come into contact with the at least one desired item as the plurality of first lamp-receiving slots 23 perimetrically traverse into the enclosure 1, seen in FIG. 2 and FIG. 4. Moreover, this arrangement allows the plurality of lamps 16 to also be upheld by the enclosure 1. Similarly, the plurality of second lamp-receiving slots 24 perimetrically traverses into the cover 15. In order for the first post 18 to be positioned with the base 17, the base 17 is terminally positioned adjacent the first post 18. The at least one light source 21 may be oriented in a variety of angles as the first post 18 is hingedly coupled with the base 17. The base 17 is slidably engaged with a first lamp-receiving slot of the plurality of first lamp-receiving slots 23, thereby allowing the corresponding lamp of the plurality of lamps 16 to be removable and interchangeable. Similarly, the threaded shaft 20 is positioned adjacent the first post 18, opposite the base 17 and is slidably engaged through a second lamp-receiving slot of the plurality of second lamp-receiving slots 24. This arrangement allows the plurality of lamps 16 to be stabilized with the cover 15. The cap 22 secures the cover 15 with the first post 18 as the cap 22 is threadedly engaged with the threaded shaft 20. The cover 15 is positioned in between the first post 18 and the cap 22 securing an enclosed environment with the plurality of lateral walls 10, the enclosure 1, and the cover 15. Moreover, this arrangement allows the cover 15 to be fastened with each lamp of the plurality of lamps 16 with the cap 22.

The at least one light source 21 effectively illuminates the at least one desired item as the at least one second post 19 is laterally positioned and rotatably coupled with the first post 18, seen in FIG. 1, FIG. 3, FIG. 4, and FIG. 5. More specifically, the at least one light source 21 is terminally positioned adjacent the at least one second post 19, opposite the first post 18, and is hingedly coupled with the at least one second post 19. The plurality of lamps 16 is also protected with the enclosure 1, the plurality of lateral walls 10, and the cover 15 as the plurality of first tab-receiving slots 28 is distributed around the plurality of first lamp-receiving slots 23. Furthermore, the plurality of lamps 16 is positioned in between an outer edge 35 of the enclosure 1 and the plurality of first lamp-receiving slots 23.

In the preferred embodiment of the present invention, the at least one second post 19 is positioned adjacent the threaded shaft 20, seen in FIG. 1, FIG. 3, and FIG. 4. This allows a display item housed within the enclosure 1 to be positioned underneath the at least one light source 21 for the plurality of lamps 16. Moreover, the plurality of lamps 16 provides downlighting upon the display item. In an alternate embodiment of the present invention, the at least one second post 19 comprises a primary post 35 and a supplementary post 36, seen in FIG. 5. Furthermore, the at least one light source 21 comprises a primary light source 37 and a supplementary light source 38. In this alternate embodiment, the both downlighting and uplighting is provided for the display item positioned within the enclosure 1. The primary post 35 positions the primary light source 37 for downlighting, and the supplementary post 36 positions the supplementary light source 38 for uplighting. Similar to the preferred embodiment of the present invention, the primary post 35 is positioned adjacent the threaded shaft 20. The supplementary post 36 is positioned adjacent the base 17 of the corresponding lamp as the display item rests on a cover plate 4 of the enclosure 1. The primary light source 37 is hingedly coupled with the primary post 35 to illuminate the display item from above. The supplementary light source 38 is hingedly coupled with the supplementary post 36 to illuminate the display item from below.

Figure 6:
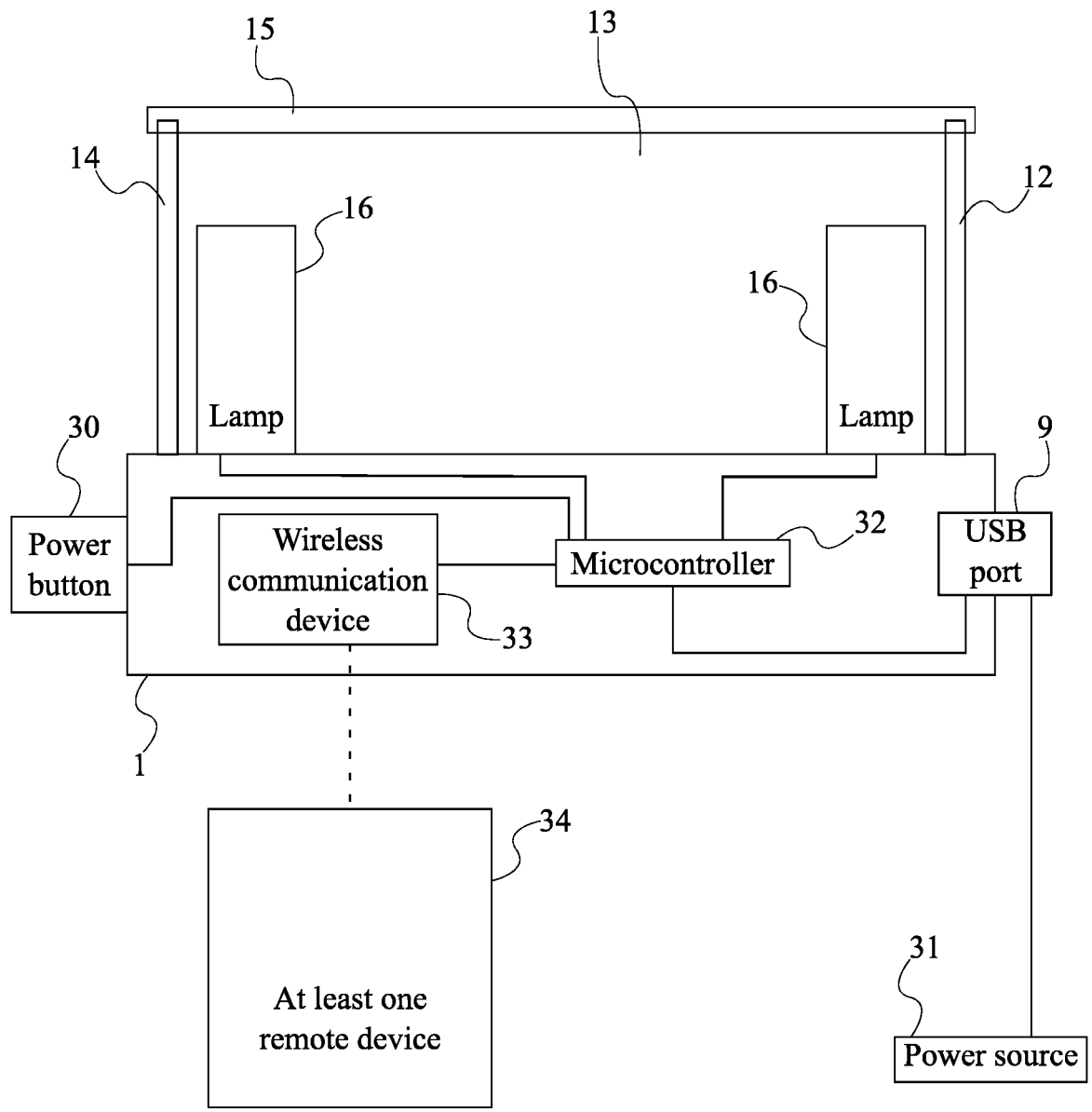
FIG. 6 is a schematic view of the electronic connections of the present invention.

The present invention further comprises a microcontroller 32, a USB port 9, a power button 30, a wireless communication device 33, and at least one remote device 34, seen in FIG. 6. The microcontroller 32 allows the emission of lights to be controlled. More specifically, the microcontroller 32 allows the color of the light to be controlled and the amplification of the light to be controlled. The microcontroller 32 also allows a user to control the time of light emission and the pulse of light emission of the at least one light source 21. The USB port 9 allows the power source 31 to connect and deliver the necessary power to the microcontroller 32 and the wireless communication device 33. The power source 31 preferably connected with the USB port 9 with a USB cable. The user may manually turn on and turn off the at least one light source 21 of each plurality of lamps 16 with the power button 30. It is understood that the power button 30 may further comprise a plurality of control buttons that electrically manage each lamp of the plurality of lamps 16. The wireless communication device 33 allows the at least one remote device 34, such as a smart phone, to remotely access the plurality of lamps 16. The aesthetic of the at least one desired item within the present invention and the aesthetic of the present invention is preserved as the microcontroller 32 and the wireless communication device 33 is positioned within the enclosure 1. The USB port 9 and power button 30 are externally and laterally mounted with the enclosure 1 so that a user may access and engage the power button 30. Moreover, the power source 31 is externally positioned with the enclosure 1. In order for a user to control the illumination of the plurality of lamps 16, the microcontroller 32 is electronically connected to the USB port 9, the power button 30, the wireless communication device 33, and the plurality of lamps 16. The electronic components receive the necessary power as the USB port 9 is electrically connected to the microcontroller 32 and the wireless communication device 33, and the power source 31 is electrically coupled with the USB port 9. The plurality of lamps 16 may be remotely controlled as the at least one remote device 34 is wireless coupled to the wireless communication device 33.

In the preferred embodiment of the present invention, the enclosure 1 comprises a base plate 2, a plurality of lateral plates 3, and a cover plate 4, seen in FIG. 3 and FIG. 4. The base plate 2 upholds the microcontroller 32 and the wireless communication device 33. The plurality of lateral plates 3 surrounds the electronic components, and the cover 15 plate 4 fully houses the electronic components. Furthermore, the cover plate 4 upholds the at least one desired item, the plurality of lateral walls 10, and consequently the cover 15. In order to house the electronic components, the plurality of lateral plates 3 is perimetrically fixed around the base 17 and is oriented perpendicular with the base plate 2. The cover 15 is fixed to the plurality of plates, positioned opposite the base plate 2.

Furthermore, the preferred embodiment of the present invention comprises an overall rectangular structure with the enclosure 1, the plurality of lateral walls 10, and the cover 15 being engaged with each other, seen in FIG. 1 and FIG. 2. The rectangular structure is defined as the cover plate 4 comprises a first edge 5, a second edge 6, a third edge 7, and a fourth edge 8, seen in FIG. 4. The plurality of lateral walls 10 also comprises a first wall 11, a second wall 12, a third wall 13, and a fourth wall 14. The enclosure 1 comprises a rectangular structure as the first edge 5 is terminally positioned adjacent the second edge 6. The third edge 7 is positioned adjacent the second edge 6, opposite the first edge 5. The fourth edge 8 is positioned adjacent the third edge 7, opposite the second edge 6. The first edge 5 is positioned adjacent the fourth edge 8, opposite the third edge 7. More specifically, the first edge 5 and the third edge 7 are oriented perpendicular with both the second edge 6 and the fourth edge 8. The overall rectangular structure is preserved as the first wall 11 traverses across the first edge 5, the second wall 12 traverses across the second edge 6, the third wall 13 traverses across the third edge 7, and the fourth wall 14 traverses across the fourth edge 8.

Although the invention has been explained in relation to its preferred embodiment, it is to be understood that many other possible modifications and variations can be made without departing from the spirit and scope of the invention as hereinafter claimed.

What is claimed is:

1. A modular display case comprises:
    an enclosure;
    a plurality of lateral walls;
    a cover;
    an interconnecting system;
    a plurality of lamps;
    a power source;
    the interconnecting system comprises a plurality of tabs, a plurality of notches, a plurality of first tab-receiving slots, and a plurality of second tab-receiving slots;
    the plurality of tabs and the plurality of notches being perimetrically distributed across the plurality of lateral walls;
    each tab of the plurality of tabs being positioned in between an arbitrary notch and an adjacent notch of the plurality of notches;
    the plurality of first tab-receiving slots perimetrically traversing into the enclosure;
    the plurality of second tab-receiving slots perimetrically traversing through the cover;
    the plurality of lateral walls being positioned between the enclosure and the cover;
    the plurality of lateral walls being removably coupled with each other with the plurality of tabs and the plurality of notches;
    the plurality of lateral walls being removably coupled with the enclosure with the plurality of tabs and the plurality of first-tab receiving slots;
    the plurality of lateral walls being removably coupled with the cover with the plurality of tabs and the plurality of second tab-receiving slots;
    the plurality of lamps being connected between the enclosure and the cover; and,
    the power source being electrically connected with the plurality of lamps.

2. The modular display case as claimed as claim 1 comprises:
    a plurality of first lamp-receiving slots;
    a plurality of second lamp-receiving slots;
    each of the plurality of lamps comprises a base, a first post, at least one second post, a threaded shaft, at least one light source, and a cap;
    the plurality of first lamp-receiving slots perimetrically traversing into the enclosure;
    the plurality of second lamp-receiving slots perimetrically traversing into the cover;
    the base being terminally positioned adjacent the first post;
    the first post being hingedly coupled with the base;
    the base being slidably engaged with a first lamp-receiving slot;
    the threaded shaft being positioned adjacent the first post, opposite the base;
    the threaded shaft being slidably engaged through a second lamp-receiving slot;
    the cap being threadedly engaged with the threaded shaft;
    the cover being positioned in between the first post and the cap;
    the at least one second post being laterally positioned and rotatably coupled with the first post;
    the at least one light source being terminally positioned adjacent the at least one second post, opposite the first post; and,
    the at least one light source being hingedly coupled with the second post.

3. The modular display case as claimed as claim 2 comprises:
    the plurality of first tab-receiving slots being distributed around the plurality of first lamp-receiving slots; and, the plurality of first tab-receiving slots being positioned between an outer edge of the enclosure and the plurality of first lamp-receiving slots.

4. The modular display case as claimed as claim 2 comprises:
the at least one second post being positioned adjacent the threaded shaft.

5. The modular display case as claimed as claim 2 comprises:
the at least one second post comprises a primary post and a supplementary post;
the at least one light source comprises a primary light source and a supplementary light source;
the primary post being positioned adjacent the threaded shaft;
the supplementary post being positioned adjacent the base;
the primary light source being hingedly coupled with the primary post; and,
the secondary light source being hingedly coupled with the supplementary post.

6. The modular display case as claimed as claim 1 comprises:
a microcontroller;
a USB port;
a power button;
a wireless communication device;
at least one remote device;
the microcontroller and the wireless communication device being positioned within the enclosure;
the USB port and the power button being externally and laterally mounted with the enclosure;
the power source being externally positioned with the enclosure;
the microcontroller being electronically connected to the USB port, the power button, the wireless communication device, and the plurality of lamps;
the USB port being electrically connected to the microcontroller and the wireless communication device;
the power source being electrically coupled with the USB port; and,
the at least one remote device being wirelessly coupled to the wireless communication device.

7. The modular display case as claimed as claim 1, wherein the plurality of lateral walls and the cover comprise transparent materials.

8. The modular display case as claimed as claim 1, wherein the enclosure comprises opaque materials.

9. The modular display case as claimed as claim 1 comprises:
the enclosure comprises a base plate, a plurality of lateral plates, and a cover plate;
the plurality of lateral plates being perimetrically fixed around the base plate;
the plurality of lateral plates being oriented perpendicular with the base plate; and,
the cover being fixed to the plurality of lateral plates, positioned opposite the base plate.

10. The modular display case as claimed as claim 9 comprises:
the cover plate comprises a first edge, a second edge, a third edge, and a fourth edge;
the plurality of lateral walls comprises a first wall, a second wall, a third wall, and a fourth wall;
the first edge being terminally positioned adjacent the second edge;
the third edge being positioned adjacent the second edge, opposite the first edge;
the fourth edge being positioned adjacent the third edge, opposite the second edge;
the first edge being positioned adjacent the fourth edge, opposite the third edge;
the first edge and the third edge being oriented perpendicular with both the second edge and the fourth edge;
the first wall traversing across the first edge;
the second wall traversing across the second edge;
the third wall traversing across the third edge; and,
the fourth wall traversing across the fourth edge.

11. A modular display case comprises:
an enclosure;
a plurality of lateral walls;
a cover;
an interconnecting system;
a plurality of lamps;
a power source;
the interconnecting system comprises a plurality of tabs, a plurality of notches, a plurality of first tab-receiving slots, and a plurality of second tab-receiving slots;
the plurality of tabs and the plurality of notches being perimetrically distributed across the plurality of lateral walls;
each tab of the plurality of tabs being positioned in between an arbitrary notch and an adjacent notch of the plurality of notches;
the plurality of first tab-receiving slots perimetrically traversing into the enclosure;
the plurality of second tab-receiving slots perimetrically traversing through the cover;
the plurality of lateral walls being positioned between the enclosure and the cover;
the plurality of lateral walls being removably coupled with each other with the plurality of tabs and the plurality of notches;
the plurality of lateral walls being removably coupled with the enclosure with the plurality of tabs and the plurality of first-tab receiving slots;
the plurality of lateral walls being removably coupled with the cover with the plurality of tabs and the plurality of second tab-receiving slots;
the plurality of lamps being connected between the enclosure and the cover; and,
the power source being electrically connected with the plurality of lamps.

12. The modular display case as claimed as claim 11 comprises:
a plurality of first lamp-receiving slots;
a plurality of second lamp-receiving slots;
each of the plurality of lamps comprises a base, a first post, at least one second post, a threaded shaft, at least one light source, and a cap;
the plurality of first lamp-receiving slots perimetrically traversing into the enclosure;
the plurality of second lamp-receiving slots perimetrically traversing into the cover;
the plurality of first tab-receiving slots being distributed around the plurality of first lamp-receiving slots;
the plurality of first tab-receiving slots being positioned between an outer edge of the enclosure and the plurality of first lamp-receiving slots;
the base being terminally positioned adjacent the first post;
the first post being hingedly coupled with the base;

the base being slidably engaged with a first lamp-receiving slot;

the threaded shaft being positioned adjacent the first post, opposite the base;

the threaded shaft being slidably engaged through a second lamp-receiving slot;

the cap being threadedly engaged with the threaded shaft;

the cover being positioned in between the first post and the cap;

the at least one second post being laterally positioned and rotatably coupled with the first post;

the at least one light source being terminally positioned adjacent the at least one second post, opposite the first post; and, the at least one light source being hingedly coupled with the second post.

13. The modular display case as claimed as claim 12 comprises:

the at least one second post being positioned adjacent the threaded shaft.

14. The modular display case as claimed as claim 12 comprises:

the at least one second post comprises a primary post and a supplementary post;

the at least one light source comprises a primary light source and a supplementary light source;

the primary post being positioned adjacent the threaded shaft;

the supplementary post being positioned adjacent the base;

the primary light source being hingedly coupled with the primary post; and, the secondary light source being hingedly coupled with the supplementary post.

15. The modular display case as claimed as claim 11 comprises:

a microcontroller;

a USB port;

a power button;

a wireless communication device;

at least one remote device;

the microcontroller and the wireless communication device being positioned within the enclosure;

the USB port and the power button being externally and laterally mounted with the enclosure;

the power source being externally positioned with the enclosure;

the microcontroller being electronically connected to the USB port, the power button, the wireless communication device, and the plurality of lamps;

the USB port being electrically connected to the microcontroller and the wireless communication device;

the power source being electrically coupled with the USB port; and, the at least one remote device being wirelessly coupled to the wireless communication device.

16. The modular display case as claimed as claim 11, wherein the plurality of lateral walls and the cover comprise transparent materials.

17. The modular display case as claimed as claim 11, wherein the enclosure comprises opaque materials.

18. The modular display case as claimed as claim 11 comprises:

the enclosure comprises a base plate, a plurality of lateral plates, and a cover plate;

the cover plate comprises a first edge, a second edge, a third edge, and a fourth edge;

the plurality of lateral walls comprises a first wall, a second wall, a third wall, and a fourth wall;

the plurality of lateral plates being perimetrically fixed around the base plate;

the plurality of lateral plates being oriented perpendicular with the base plate; and, the cover being fixed to the plurality of lateral plates, positioned opposite the base plate;

the first edge being terminally positioned adjacent the second edge;

the third edge being positioned adjacent the second edge, opposite the first edge;

the fourth edge being positioned adjacent the third edge, opposite the second edge;

the first edge being positioned adjacent the fourth edge, opposite the third edge;

the first edge and the third edge being oriented perpendicular with both the second edge and the fourth edge;

the first wall traversing across the first edge;

the second wall traversing across the second edge;

the third wall traversing across the third edge; and, the fourth wall traversing across the fourth edge.

* * * * *